US011922230B2

(12) United States Patent
Dewhare et al.

(10) Patent No.: US 11,922,230 B2
(45) Date of Patent: Mar. 5, 2024

(54) NATURAL LANGUAGE PROCESSING OF API SPECIFICATIONS FOR AUTOMATIC ARTIFACT GENERATION

(71) Applicant: Conektto, Inc., Dublin, CA (US)

(72) Inventors: Amol Dewhare, Dublin, CA (US); Ramanathan Sathianarayanan, Dublin, CA (US); Krishna Bharath Kashyap, Hyderabad (IN)

(73) Assignee: CONEKTTO, INC., Dublin, CA (US)

( * ) Notice: Subject to any disclaimer, the term of this patent is extended or adjusted under 35 U.S.C. 154(b) by 0 days.

(21) Appl. No.: 18/296,899

(22) Filed: Apr. 6, 2023

(65) Prior Publication Data

US 2023/0244552 A1 Aug. 3, 2023

Related U.S. Application Data

(63) Continuation of application No. PCT/US2021/053963, filed on Oct. 7, 2021.

(60) Provisional application No. 63/213,857, filed on Jun. 23, 2021, provisional application No. 63/090,075, filed on Oct. 9, 2020.

(51) Int. Cl.
*G06F 3/00* (2006.01)
*G06F 9/445* (2018.01)
*G06F 9/54* (2006.01)

(52) U.S. Cl.
CPC ............ *G06F 9/54* (2013.01); *G06F 9/44521* (2013.01)

(58) Field of Classification Search
CPC ..................................................... G06F 9/541
USPC ......................................................... 719/328
See application file for complete search history.

(56) References Cited

U.S. PATENT DOCUMENTS

| 9,946,581 | B2* | 4/2018 | Ahuja | G06F 9/54 |
|---|---|---|---|---|
| 10,540,270 | B1* | 1/2020 | Surkatty | G06F 11/3688 |
| 10,678,679 | B1* | 6/2020 | Sonawale | G06F 11/3684 |
| 10,922,748 | B1* | 2/2021 | Rockefeller | G06Q 30/0601 |
| 11,593,363 | B1* | 2/2023 | Sandall | G06F 16/2272 |
| 2003/0088808 | A1* | 5/2003 | Phelps | G06F 11/26 714/25 |

(Continued)

OTHER PUBLICATIONS

Huajun Chen, Mashup by Surfing a Web of Data APIs, (Year: 2009).*

(Continued)

*Primary Examiner* — Lechi Truong
(74) *Attorney, Agent, or Firm* — Christensen O'Connor Johnson Kindness PLLC

(57) ABSTRACT

In some embodiments, an API specification document is processed to extract metadata representing API elements. Dependencies are mapped between the API elements using orders and ranks to create a metamodel that includes a map of metadata attributes and links that represent functional and operational aspects of program elements accessible via the API. The metamodel is stored for use in generating support infrastructure artifacts. In some embodiments, database entities are compared to a metamodel to generate matches. Each match indicates a confidence score and a relationship between a database entity and a metadata attribute. A selection of a metadata attribute is received for inclusion in the new API, and a selection of a database entity to be associated with the metadata attribute for the new API is received. The computing system updates the confidence score for the match that indicates the relationship between the database entity and the metadata attribute.

20 Claims, 14 Drawing Sheets

(56) References Cited

U.S. PATENT DOCUMENTS

| | | | |
|---|---|---|---|
| 2009/0012987 A1 | 1/2009 | Kaminsky et al. | |
| 2010/0036801 A1* | 2/2010 | Pirvali | G06F 8/443 |
| | | | 707/E17.017 |
| 2012/0167063 A1* | 6/2012 | Detwiler | G06F 9/449 |
| | | | 717/139 |
| 2014/0089538 A1* | 3/2014 | Bachrany | G06F 3/00 |
| | | | 710/37 |
| 2015/0350234 A1* | 12/2015 | Reno | H04L 67/02 |
| | | | 726/25 |
| 2017/0180209 A1* | 6/2017 | Shevenell | H04L 41/122 |
| 2018/0052897 A1 | 2/2018 | Namarvar et al. | |
| 2018/0053255 A1 | 2/2018 | Valdyanathan et al. | |
| 2019/0114202 A1* | 4/2019 | Wang | G06F 9/5044 |
| 2019/0361757 A1 | 11/2019 | Kohlmeier et al. | |
| 2020/0242254 A1* | 7/2020 | Velur | G06F 21/552 |
| 2022/0207429 A1* | 6/2022 | Haribhakti | G06N 20/10 |
| 2022/0253532 A1* | 8/2022 | Bishop, III | G06F 11/3688 |

OTHER PUBLICATIONS

Mark Grechanik, A Search Engine For Finding Highly Relevant Applications. (Year: 2010).*

International Search Report and Written Opinion dated Feb. 14, 2022, issued in corresponding International Application No. PCT/US2021/053963, filed Oct. 7, 2021, 12 pages.

\* cited by examiner

```
{
 "swagger":"2.0",
 "info":
 {
      "description":"\"API for the PEDS Download system\"",
      "title": "\"PEDS API\""
 },
 "host":"ped.uspto.gov", "basePath":
"/api",
 "paths": {

"/full-download": {
    "get": {
      "summary":"Download all of the data in PBD as a single file.",
      "description":"This end point returns a 302 redirect to the data set to be downloaded.",
      "operationId": "fullDownloadUsingGET",
      "produces": [ "application/json"],
      "parameters": [
      {
         "name": "fileName",
         "in": "query",
         "description": "Download file name",
         "required": false,
         "type": "string",
         "allowEmptyValue": false
      }, ],
```

NATURAL LANGUAGE PROCESSING OF API SPECIFICATIONS FOR AUTOMATIC ARTIFACT GENERATION

CROSS REFERENCE TO RELATED APPLICATIONS

This application is a continuation of International Patent Application No. PCT/US2021/053963, filed Oct. 7, 2021, which claims the benefit of
Provisional Application No. 63/090,075, filed Oct. 9, 2020, and Provisional Application No. 63/213,857, filed Jun. 23, 2021, the entire disclosures of which
are hereby incorporated by reference herein for all purposes.

BACKGROUND

Webservices application programming interfaces (APIs) are often built based on API specifications written in a standard format, including but not limited to OpenAPI and others. An API specification is used as the starting point to design, develop, test, deploy and monitor an API. Webservice code, test data, virtual services, functional tests, performance tests, security tests and monitoring programs are some examples of code components used during the development, testing, and use of a webservice API. These code components are referred to in some places herein as webservices artifacts, API artifacts, support infrastructure artifacts, or just "artifacts."

Typically, artifacts for an API are created manually by engineers using several third-party tools while referencing the API specification. This task is tedious, time-consuming, and likely to introduce additional bugs or points of failure through internal inconsistencies. Further, as the number of APIs and underlying databases in a given system or used by a given organization grow, the ability for an engineer to concurrently understand and manage all of the APIs and databases becomes intractable, and newly added APIs often become out-of-sync with existing APIs. What is desired are automated techniques for analyzing API specifications, generating artifacts, and managing creation of new APIs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of automatically generating support infrastructure artifacts for software accessible via an application programming interface (API) is provided. A computing system processes an API specification document to extract metadata representing API elements. The computing system scores the metadata to determine order and rank of the API elements. The computing system maps dependencies between the API elements using the orders and the ranks to create a metamodel, wherein the metamodel includes a map of metadata attributes and links that represent functional and operational aspects of program elements accessible via the API. The metamodel is stored for use in generating support infrastructure artifacts.

Processing the API specification document to extract metadata representing API elements may include annotating elements within the API specification document, analyzing text of the annotated elements, and identifying key elements based on the textual analysis as the metadata. Processing the API specification document to extract metadata representing API elements may include consideration of other similar APIs to determine as-yet undetected business rules.

Scoring the metadata to determine order and rank of the API elements may be based on at least one of frequency of usage of the element, whether the element is optional or mandatory, data type characteristics of the element, and entity and relationships within and between resources associated with the element.

Determining order and rank of the API elements may include determining whether each element is a business function, a primitive element to be operated on by other entities, a resource, an operation, or a result.

The computer-implemented method may further include validating the map of metadata attributes and links against a statistical confidence interval. The computer-implemented method may further include automatically generating computer-executable instructions based on the metamodel. The automatically generated computer-executable instructions may include deployable template code that implements the API. The automatically generated computer-executable instructions, in response to execution by one or more processors of a computing device, may cause the computing device to provide a virtualized service that provides services of software accessible via the API.

The computer-implemented method may further include generating one or more tests based on the metamodel. The computer-implemented method may further include generating test data using machine learning and the metamodel. Generating test data using machine learning and the metamodel may include generating at least one of tests and test data based on comparing the metamodel to metamodels of other similar API specifications to determine tests for undetected business rules.

The computer-implemented method may further include generating a visualization of the metamodel. Generating the visualization may include generating a presentation of at least one test result associated with at least one metadata attribute associated with the test result. Generating the visualization may include generating a presentation of at least one performance metric associated with at least one metadata attribute.

In some embodiments, a computer-implemented method of automatically generating support infrastructure artifacts for software accessible via an application programming interface (API) is provided. Computer-executable instructions are automatically generated based on a metamodel, where the metamodel includes a map of metadata attributes and links that represent functional and operational aspects of program elements accessible via the API. The automatically generated computer-executable instructions may include deployable template code. The automatically generated computer-executable instructions, in response to execution by one or more processors of a computing device, may cause the computing device to provide a virtualized service that provides services of the software accessible via the API.

In some embodiments, a computer-implemented method of automatically generating support infrastructure artifacts for software accessible via an application programming interface (API) is provided. At least one of a test and a set of test data are generated based on a metamodel. The metamodel includes a map of metadata attributes and links that represent functional and operational aspects of program elements accessible via the API. Generating the set of test data may include comparing the metamodel to metamodels of other similar APIs to determine tests for undetected business rules.

In some embodiments, a computer-implemented method of generating a new application programming interface (API) is provided. A computing system processes a database schema to determine one or more database entities. The computing system compares the database entities to a metamodel to generate one or more matches. The metamodel includes one or more metamodel schemas that each include one or more metadata attributes accessible via one or more existing APIs, and each match indicates a confidence score and a relationship between a database entity and a metadata attribute, The computing system presents a user interface based on the metamodel for defining the new API. The computing system receives, via the user interface, a selection of a metadata attribute for inclusion in the new API. The computing system receives, via the user interface, a selection of a database entity to be associated with the metadata attribute for the new API. The computing system updates the confidence score for the match that indicates the relationship between the database entity and the metadata attribute.

Processing the database schema to determine the one or more database entities may include creating a database entity group associated with each table defined in the database schema, and for each database entity group, creating a database entity for each column of the table associated with the database entity group.

Presenting the user interface may include presenting an interface element associated with each metadata attribute in the metamodel. Analyzing text of the annotated elements may include at least one of processing the text of the annotated elements using natural language processing techniques, and processing the text of the annotated elements using rule-based techniques. Generating the visualization may include generating a presentation of at least one metadata attribute, wherein the at least one metadata attribute is a business function, a functional element, a resource, an endpoint, an operation, and a status code. The presentation of at least one metadata attribute may include at least one metadata attribute of a first type and at least one metadata attribute of a second type. Generating the visualization may include generating a presentation of a link that indicates that the at least one metadata attribute of the first type is used by the at least one metadata attribute of the second type. A size of each interface element may be based on a criticality of the associated metadata attribute in the metamodel.

Comparing the database entities to the metamodel to generate one or more matches may include one or more of comparing a number of metadata attribute in a metamodel schema to a number of database entities in a database entity group, comparing a name of a metamodel schema to a name of a database entity group, comparing a data type of a metadata attribute to a data type of a database entity, and comparing a name of a metadata attribute to a name of a database entity.

Comparing the name of a metamodel schema to the name of the database entity group or comparing the name of a metadata attribute to the name of a database entity may include using one or more comparison heuristics, where the one or more comparison heuristics include comparing one or more starting characters of the names, breaking each name into two or more sub-names and comparing the sub-names, and determining an edit distance or a cosine similarity between the names.

Receiving the selection of the database entity to be associated with the metadata attribute for the new API may include determining a highest confidence match associated with the selected metadata attribute, wherein the highest confidence match is a match that has a highest confidence score out of all matches associated with the selected metadata attribute; presenting the database entity associated with the highest confidence match; in response to receiving a confirmation of the presented database entity, using the database entity associated with the highest confidence match as the selected database entity; and in response to receiving a lack of confirmation of the presented database entity, receiving a selection of a different database entity and using the different database entity as the selected database entity.

Presenting the database entity associated with the highest confidence match may include presenting the database entity associated with the highest confidence match in a first color, and presenting other database entities in one or more colors other than the first color.

Presenting the database entity associated with the highest confidence match may include presenting the database entity associated with the highest confidence match in a first size, and presenting other database entities in one or more other sizes smaller than the first size.

In addition to computer-implemented methods, non-transitory computer-readable media having instructions stored thereon that, in response to execution by one or more processors of a computing system, cause the computing system to perform such methods; as well as computing systems configured to perform such methods, are also disclosed.

BRIEF DESCRIPTION OF THE DRAWINGS

Many of the attendant advantages of this invention will become more readily appreciated as the same become better understood by reference to the following detailed description, when taken in conjunction with the accompanying drawings, wherein:

FIG. 1A and FIG. 1B illustrate a portion of a non-limiting example embodiment of an API specification document that may be processed by embodiments of the present disclosure.

DETAILED DESCRIPTION

Example API Specification

Figure 1B:

FIG. 1A and FIG. 1B illustrate a portion of a non-limiting example embodiment of an API specification document that may be processed by embodiments of the present disclosure. As known to one of ordinary skill in the art, an API specification describes aspects of an application programming interface that a caller may interact with. Typically, an API specification document may describe these aspects in a standardized format, including but not limited to Swagger, OpenAPI, RAML, API Blueprint, WADL, GraphQL and Slate, in order to allow sharing and reuse. Though each standard has different benefits and drawbacks, the formats generally provide the same types of information in a structured format, including host names, endpoints, parameters (and their descriptions), status code responses, response objects, and data types.

As shown by the portion of the API specification document 102 illustrated in FIG. 1A, the API specification document 102 is in a Swagger format and provides descriptions of multiple aspects of the publicly available Patent Examination Data System (PEDS) API provided by the USPTO, from which customers can retrieve and download records of USPTO patent applications. While the API specification document 102 illustrated in FIG. 1A and FIG. 1B is edited for brevity, the full version of the API specification document for the PEDS API is available on the USPTO Open Data Portal.

The illustrated API specification document 102 shows multiple aspects of the PEDS API. First, an "info" field includes sub-fields indicating a "description" and a "title" for the API, with values that provide the description and the title for the API in plain language. A "basePath" field with a value of "/api" is shown, and a "path" field with a value of "/full-download" is also shown. Together with the value "ped.uspto.gov" in the "host" field, these portions of the API specification document 102 indicate that a query endpoint for a function referred to as "full-download" is available at the URL "https://ped.uspto.gov/api/full-download".

The "/full-download" path includes sub-fields for "get" (i.e., information related to a GET query submitted to the path) and "responses" (i.e., possible status codes returned by queries submitted to the path). The "get" field includes further sub-fields, including a "summary" field, a "description" field, an "operationId" field, a "produces" field, and a "parameters" field. Each field of these fields is self-explanatory, but one will note that a single string-type parameter named "fileName" is provided.

The portion of the API specification document 102 illustrated in FIG. 1B provides additional information for the "/full-download" path. Namely, a set of potential "responses" is listed, as well as an indication that the path is not deprecated. For each "response," a "description" is provided, and for the "200" response, a "schema" for the content of the response is provided that references a "definition" later in the API specification document 102.

After the "path" information, the API specification document 102 lists a set of "definitions", which describe data types that can be used elsewhere in the API specification document 102. Three "definitions" are illustrated: an "Annotation" (which is of an "object" type), a "CMSData" (which is a structure including four properties), and a "title" (which refers to the "CMSData" definition).

In the full version of the PEDS API specification document, more paths, parameters, and responses for each path are provided, as well as additional definitions (including definitions for referenced types such as "RedirectView"). Limited examples of each of these features are illustrated for the sake of brevity, since one of skill in the art will understand the additional features.

Creation of Metamodels

Figure 2:
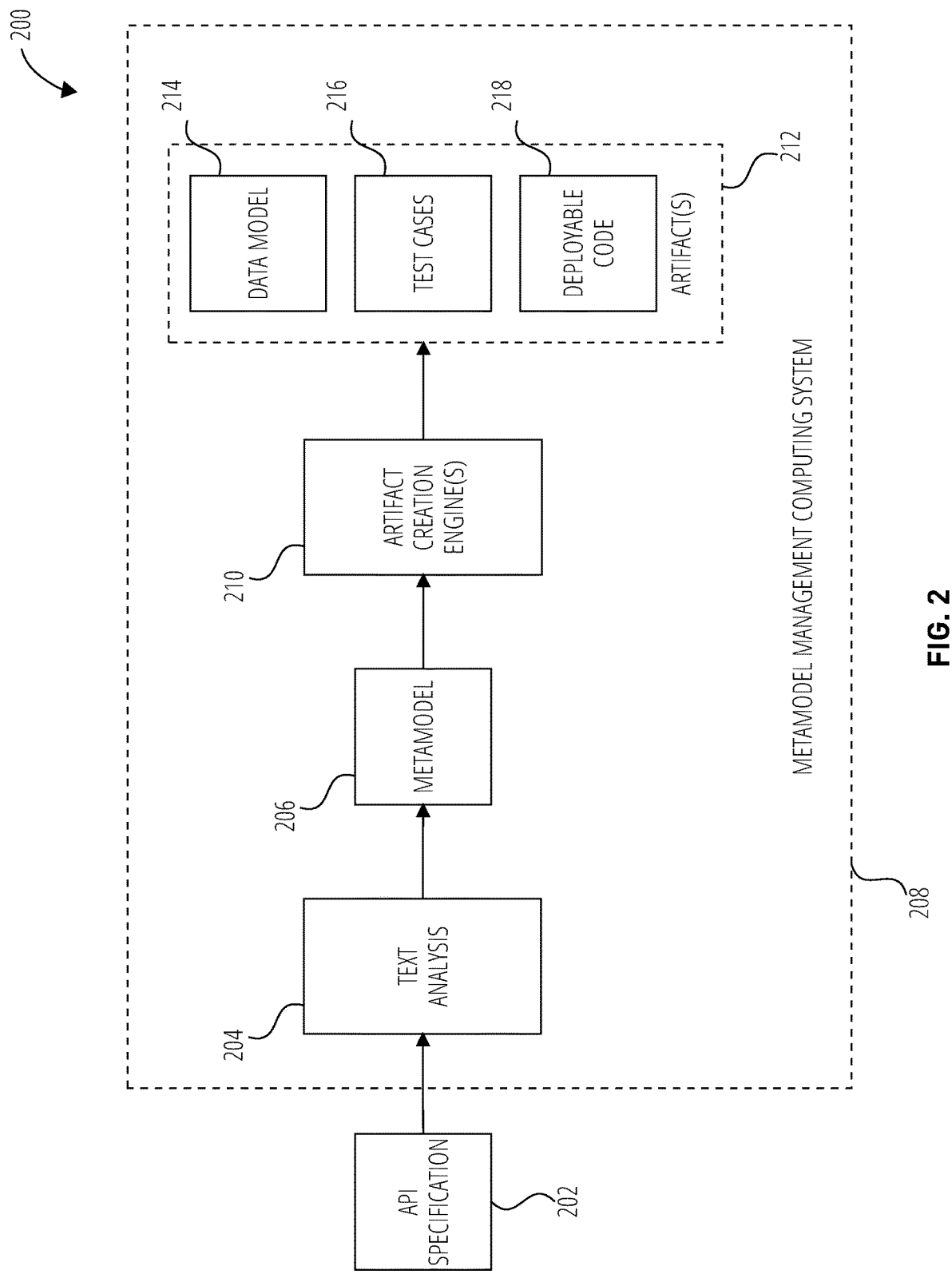
FIG. 2 is a block diagram that illustrates, at a high level, a non-limiting example embodiment of processing flow of an API specification according to various aspects of the present disclosure.

FIG. 2 is a block diagram that illustrates, at a high level, a non-limiting example embodiment of processing flow of an API specification according to various aspects of the present disclosure. Within the processing flow 200, an API specification is processed to create a metamodel, which may then be used to create various artifacts for the API.

The processing flow 200 begins when an API specification 202 is provided to a metamodel management computing system 208. The metamodel management computing system 208 may validate various aspects of the API specification 202, including but not limited to versions, format, document structure, data types, rich text formatting, references, schema, and extensions, against industry established standards like Swagger, Open API and GraphQL, to ensure that the API specification 202 can be successfully processed.

This validation is followed by parsing and extraction of metadata attributes using various text analysis 204 techniques, including but not limited to natural language processing techniques and rule-based techniques. This may be performed by iterative traversing of the API specification 202 to annotate template elements, analyzing textual content, and identifying key API elements.

One aspect of the text analysis 204 to note is that while the API specification 202 may be provided in a machine-parseable format, the present disclosure may use textual analysis such as natural language processing techniques and/or rule-based techniques to extract additional semantic meaning from the API specification 202 than is represented by the machine-parseable format alone. For example, natural language processing and/or rule-based techniques may find a given term that is repeated in unstructured comments or documentation of the API specification 202, and may add that term as a metadata attribute.

Upon determination of the metadata attributes, the processing flow 200 generates a metamodel 206. Generation of the metamodel 206 may include derivation of order and rank of metadata attributes. This involves scoring of attributes based on frequency of usage, optional vs mandatory characteristics, data type characteristics, entity and relationship within and between resources identified in the API specification 202. Final ordered and scored metadata attributes may be associated with unique metamodel identifiers. The metamodel 206 may also include tracked and mapped dependencies between metadata attributes, and metadata attributes may be assigned into structured nodes and links. These nodes and links may be validated against a statistical confidence interval algorithm to determine the accuracy of the machine generated structure of the metamodel 206. The metamodel 206 may thus include a bi-directional network map of functional and operational aspects of the API specification 202.

Once the metamodel 206 is created, one or more artifact creation engines 210 may use the metamodel 206 to create one or more artifacts 212, including but not limited to a data model 214 that can be used to generate one or more user interfaces for navigating the API specification 202 and/or creating new API specifications, test cases 216 for exercising the API, and deployable code 218 for implementing the API and/or simulated services for providing functionality accessible through the API for test purposes.

Figure 3:
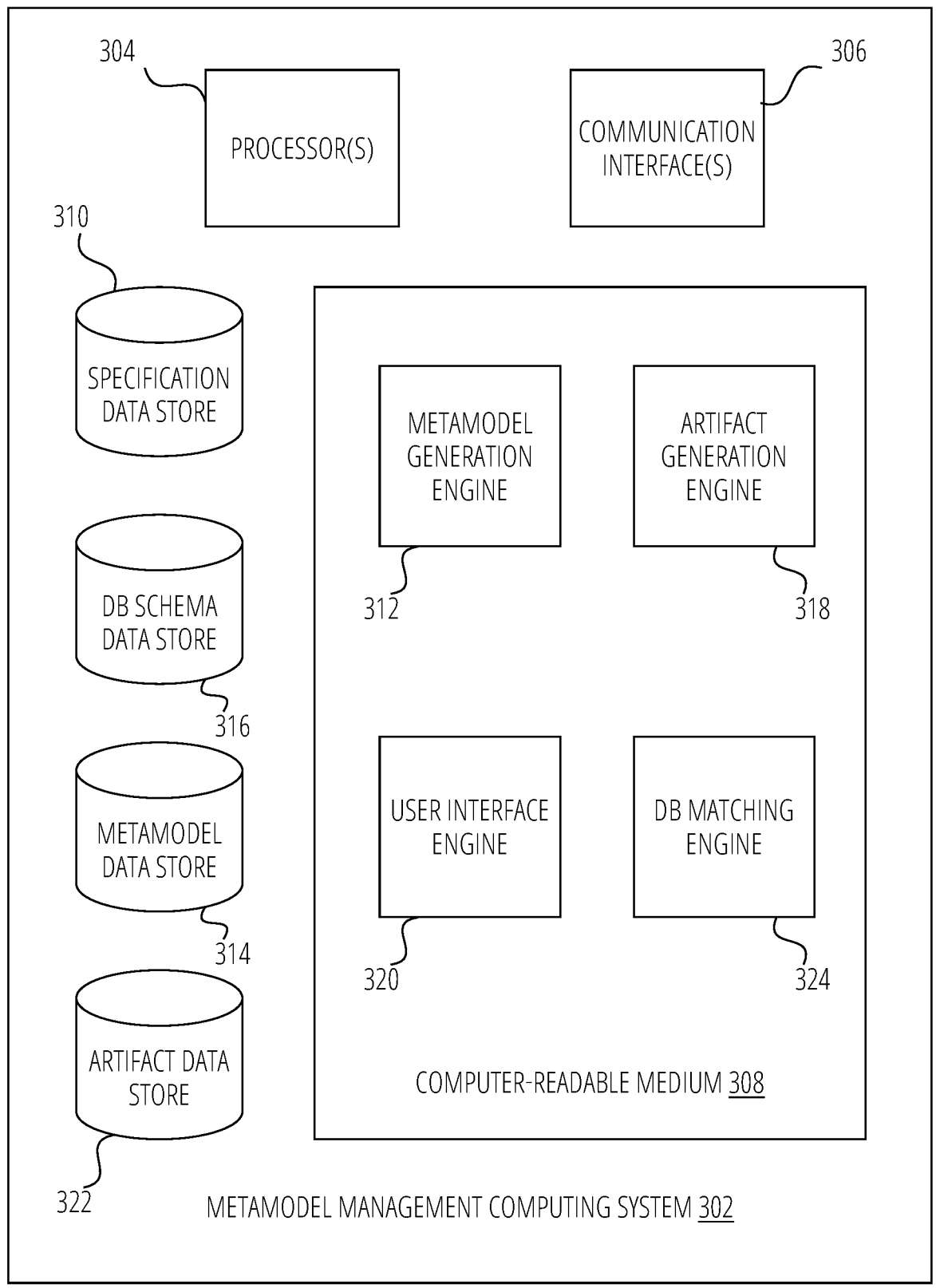
FIG. 3 is a block diagram that illustrates aspects of a non-limiting example embodiment of a metamodel management computing system according to various aspects of the present disclosure.

FIG. 3 is a block diagram that illustrates aspects of a non-limiting example embodiment of a metamodel management computing system according to various aspects of the present disclosure. The illustrated metamodel management computing system 302 may be implemented by any computing device or collection of computing devices, including but not limited to a desktop computing device, a laptop computing device, a mobile computing device, a server computing device, a computing device of a cloud computing system, and/or combinations thereof. The metamodel management computing system 302 is configured to build metamodels based on API specifications, to create artifacts based on metamodels, and to create user interfaces based on metamodels and database schemas for creating new API specifications.

As shown, the metamodel management computing system 302 includes one or more processors 304, one or more communication interfaces 306, a specification data store 310, a DB schema data store 316, a metamodel data store 314, an artifact data store 322, and a computer-readable medium 308.

In some embodiments, the processors 304 may include any suitable type of general-purpose computer processor. In some embodiments, the processors 304 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 306 include one or more hardware and or software interfaces suitable for providing communication links between components. The communication interfaces 306 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 308 has stored thereon logic that, in response to execution by the one or more processors 304, cause the metamodel management computing system 302 to provide a metamodel generation engine 312, an artifact generation engine 318, a user interface engine 320, and a DB matching engine 324.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the metamodel generation engine 312 is configured to receive API specification documents and to create metamodels by processing them using various techniques (including comparisons to other data stored in the metamodel data store 314 and/or the specification data store 310). In some embodiments, the artifact generation engine 318 is configured to generate various artifacts based on metamodels stored in the metamodel data store 314. In some embodiments, separate artifact generation engines 318 may be provided for each type of artifact to be created, while in some embodiments, a single artifact generation engine 318 may generate multiple types of artifacts.

In some embodiments, the DB matching engine 324 is configured to match database entities from database schemas to metadata attributes in metamodels, and to store the matches in the DB schema data store 316. In some embodiments, the user interface engine 320 is configured to present various types of user interfaces, including but not limited to interfaces for browsing API structures represented by metamodels and interfaces for creating new API specifications that use database entities in a consistent manner.

Further description of the configuration of each of these components is provided below.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 4:
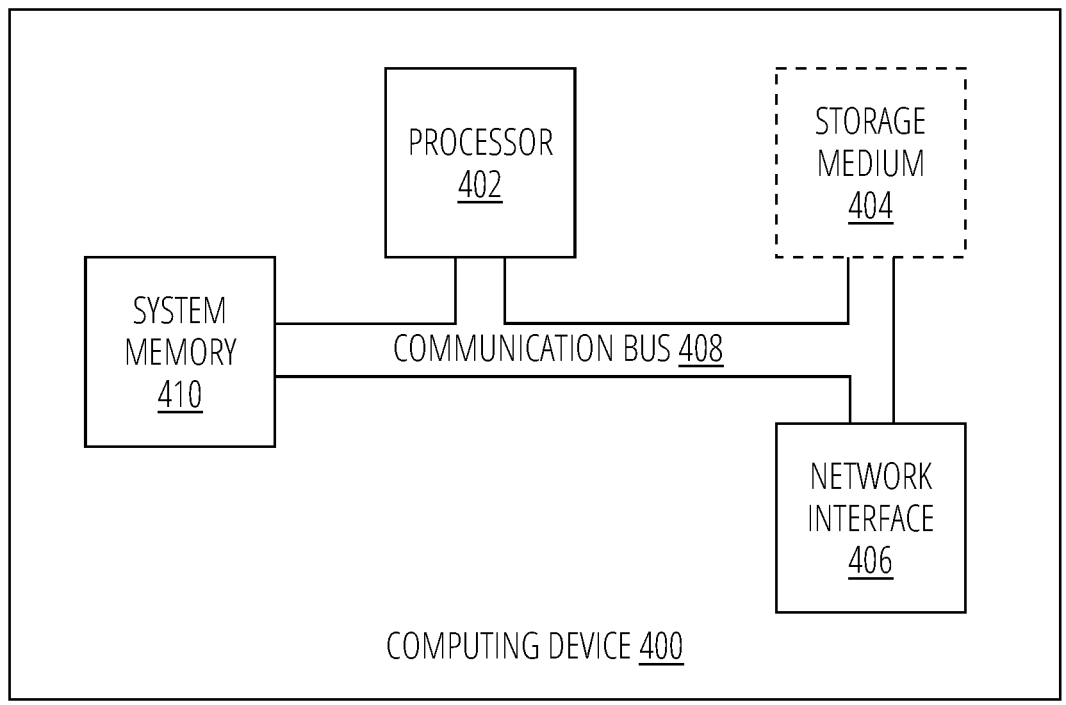
FIG. 4 is a block diagram that illustrates a non-limiting example embodiment of a computing device appropriate for use as a computing device with embodiments of the present disclosure.

FIG. 4 is a block diagram that illustrates aspects of an exemplary computing device 400 appropriate for use as a computing device of the present disclosure. While multiple different types of computing devices were discussed above, the exemplary computing device 400 describes various elements that are common to many different types of computing devices. While FIG. 4 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 400 may be any one of any number of currently available or yet to be developed devices.

In its most basic configuration, the computing device 400 includes at least one processor 402 and a system memory 410 connected by a communication bus 408. Depending on the exact configuration and type of device, the system memory 410 may be volatile or nonvolatile memory, such as read only memory ("ROM"), random access memory ("RAM"), EEPROM, flash memory, or similar memory technology. Those of ordinary skill in the art and others will recognize that system memory 410 typically stores data and/or program modules that are immediately accessible to and/or currently being operated on by the processor 402. In this regard, the processor 402 may serve as a computational center of the computing device 400 by supporting the execution of instructions.

As further illustrated in FIG. 4, the computing device 400 may include a network interface 406 comprising one or more components for communicating with other devices over a network. Embodiments of the present disclosure may access basic services that utilize the network interface 406 to perform communications using common network protocols. The network interface 406 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 406 illustrated in FIG. 4 may represent one or more wireless interfaces or physical communication interfaces described and illustrated above with respect to particular components of the computing device 400.

In the exemplary embodiment depicted in FIG. 4, the computing device 400 also includes a storage medium 404. However, services may be accessed using a computing device that does not include means for persisting data to a local storage medium. Therefore, the storage medium 404 depicted in FIG. 4 is represented with a dashed line to indicate that the storage medium 404 is optional. In any event, the storage medium 404 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 402, system memory 410, communication bus 408, storage medium 404, and network interface 406 are known and commercially available. For ease of illustration and because it is not important for an understanding of the claimed subject matter, FIG. 4 does not show some of the typical components of many computing devices. In this regard, the computing device 400 may include input devices, such as a keyboard, keypad, mouse, microphone, touch input device, touch screen, tablet, and/or the like. Such input devices may be coupled to the computing device 400 by wired or wireless connections including RF, infrared, serial, parallel, Bluetooth, Bluetooth low energy, USB, or other suitable connections protocols using wireless or physical connections. Similarly, the computing device 400 may also include output devices such as a display, speakers, printer, etc. Since these devices are well known in the art, they are not illustrated or described further herein.

Figure 5:
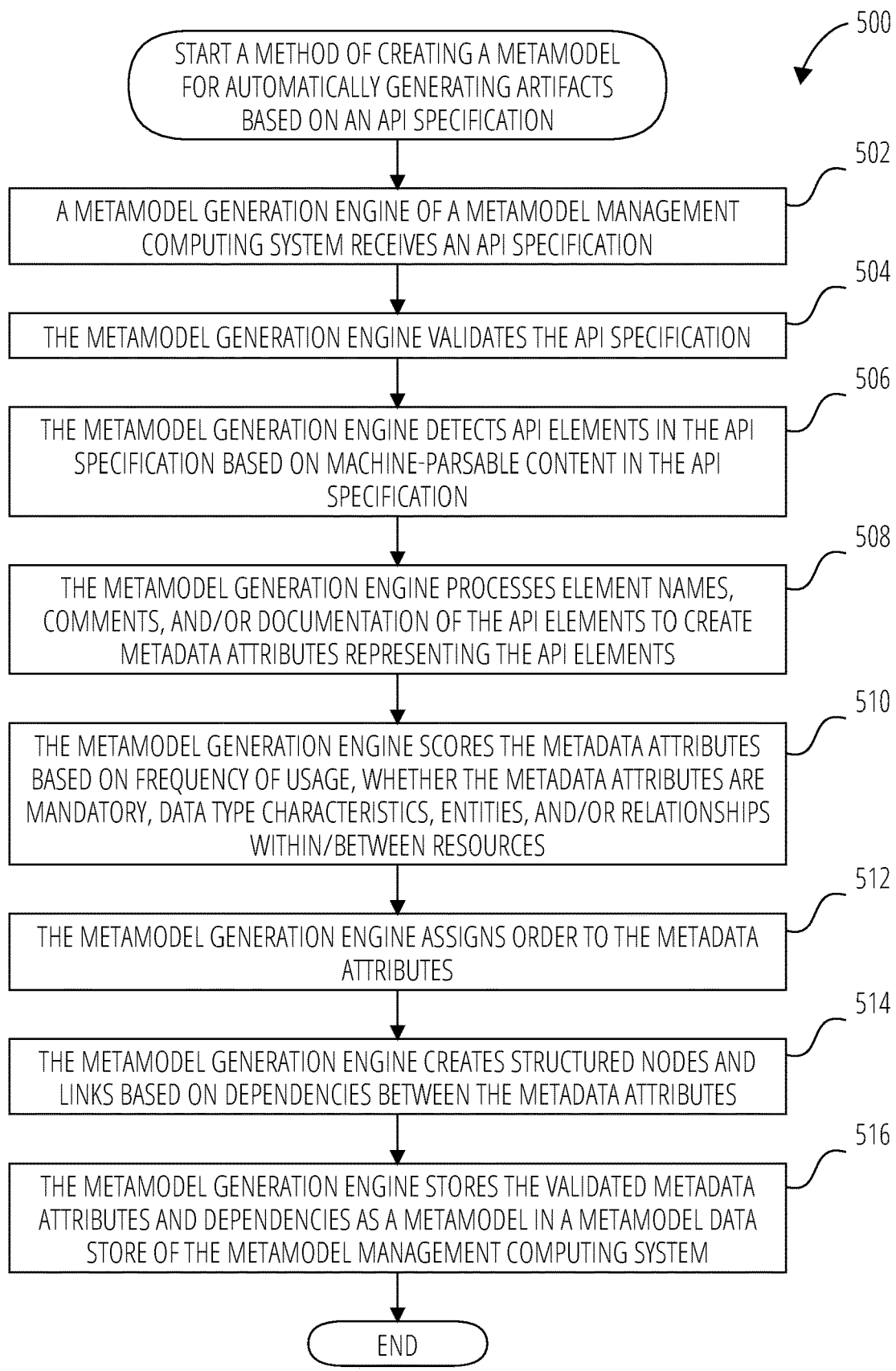
FIG. 5 is a flowchart illustrating a non-limiting example embodiment of a method of creating a metamodel for automatically generating artifacts based on an API specification according to various aspects of the present disclosure.

FIG. 5 is a flowchart illustrating a non-limiting example embodiment of a method of creating a metamodel for automatically generating artifacts based on an API specification according to various aspects of the present disclosure. In the method 500, a metamodel management computing system 302 processes an API specification to determine API elements, to score and rank the API elements to determine metadata attributes, and to determine relationships between the metadata attributes to create a metamodel representing the API specification. The method 500 uses a variety of text-processing techniques to determine, score, rank, and/or otherwise analyze the API elements.

From a start block, the method 500 proceeds to block 502, where a metamodel generation engine 312 of a metamodel management computing system 302 receives an API specification. In some embodiments, the metamodel generation engine 312 may be directed to an online location, such as a URL, that provides the API specification in a downloadable format. In some embodiments, a user may upload a file that includes the API specification directly to the metamodel management computing system 302. In some embodiments, the user may cut-and-paste text that defines the API specification into a user interface provided by the metamodel management computing system 302.

At block 504, the metamodel generation engine 312 validates the API specification. In some embodiments, this validation may include determining a standard with which the API specification is purported to be compliant (e.g., OpenAPI, Swagger, GraphQL, etc.), and determining whether the API specification includes contents that comply with the standard. The standard may be determined based on an indication by the user of the standard, by retrieving the indication of the standard from the API specification itself (such as the "swagger" element in the API specification document 102 illustrated in FIG. 1A), by a file extension of a document containing the API specification, or by any other suitable technique. In some embodiments, validation may also include checking a version, a document structure, included data types, presence or absence of rich text formatting, references, schemas, and/or extensions, to determine whether the content of the API specification can be processed by the metamodel management computing system 302. If the validation at block 504 is not successful, an error message may be presented and the method 500 may terminate. The remainder of the method 500 assumes that the validation at block 504 was successful.

At block 506, the metamodel generation engine 312 detects API elements in the API specification based on machine-parsable content in the API specification. For standard formats of API specifications, parsing libraries are available that convert machine-readable portions of the API specification into one or more data structures that represent API elements of the the API specification, including but not limited to endpoints, parameters, data types, return codes, documentation, and comments. In some embodiments, the metamodel generation engine 312 uses a parsing library to create such data structures.

At block 508, the metamodel generation engine 312 processes element names, comments, and/or documentation of the API elements to create metadata attributes representing the API elements. In some embodiments, element names included in the data structures that represent the machine-readable portions of the API specification are converted directly into metadata attributes. For example, an endpoint detected in the API specification with a given name may be converted directly into a metadata attribute specifying an endpoint having the given name, and a parameter with a given name and a given data type may be converted directly into a metadata attribute specifying a parameter with the given name and the given data type. As another example, a dependency detected between a parameter API element, a data type API element, and/or an endpoint API element may be represented with its own metadata attribute.

Beyond this creation of metadata attributes based on machine-readable portions of the API specification, embodiments of the present disclosure also use various text analysis techniques to extract further information for creating metadata attributes. In some embodiments, the metamodel generation engine 312 may use rule-based techniques to determine additional metadata attributes that are represented in element names, comments, or documentation of the API elements that are not otherwise presented in a structured, parseable format. For example, rule-based normalization (e.g., case normalization, removal of white space, synset associations) may be used to determine that terms that are not precisely identical should still map to the same metadata attribute (e.g., parameters such as "user_name", "user name", and "UserName" would all be normalized to the same value, as may a parameter such as "user_id" that is included in a synset along with "username"). As another example, a pattern-based search such as a regular expression may be used to find text such as "X depends on Y," where X and Y are names of other API elements, in order to find dependencies between API elements for which metadata attributes may be created.

In some embodiments, the metamodel generation engine 312 may use natural language processing techniques to determine additional metadata attributes that are represented in element names, comments, or documentation of the API elements that are not otherwise presented in a structured, parseable format. For example, the metamodel generation engine 312 may use one or more natural language processing techniques, including but not limited to text pre-processing techniques (including but not limited to stop word removal, stemming, normalization, spelling correction, and expanding of contractions) and NLP tasks (including but not limited to part of speech tagging, dependency parsing, named entity recognition, topic modeling, latent semantic analysis, latent Dirichlet allocation, and text classification) to identify additional metadata attributes, and/or to add additional information for metadata attributes extracted from the machine-readable portions of the API specification.

For example, the machine-parseable portions of the API specification may not indicate a dependency between a first API element and a second API element. However, topic modeling of text in the documentation or comments may indicate that both the first API element and the second API element are mentioned when a given topic is discussed, and so a dependency between the first API element and the second API element may be inferred. As another example, named entity recognition may detect an API element discussed in the documentation but not directly accessible via the exposed portions of the API documented in the API specification. As yet another example, part of speech tagging and/or dependency parsing may be used to find other dependencies between API elements that are not explicitly stated in the machine-parseable portions for which metadata attributes can be created. These techniques may be particularly useful for detecting business functions, resources, and/or operations that are accessed or enabled by the API but that are not necessarily directly represented by one or more endpoints.

One will recognize that the examples of rule-based and NLP-based creation of metadata attributes are examples only, and that in some embodiments, other types of rule-based and/or NLP-based techniques may be used to create other types of metadata attributes based on comments, documentation, and/or element names.

At block 510, the metamodel generation engine 312 scores the metadata attributes based on frequency of usage, whether the metadata attributes are mandatory, data type characteristics, entities, and/or relationships within/between resources. For example, a metadata attribute that is used very frequently, such as a metadata attribute associated with a record identifier parameter that is required by every endpoint, may be given a higher score than a metadata attribute parameter that is used only by a single endpoint and is optional for that endpoint. Likewise, a metadata attribute that is the target of dependencies from multiple other metadata attributes may be given a higher score than a metadata attribute that is not a target of dependencies.

At block 512, the metamodel generation engine 312 assigns order to the metadata attributes. In some embodiments, the order may be based on the scores established at block 510. By assigning an order to the metadata attributes, user interfaces can be created that use the order to surface the most critical metadata attributes, thus allowing a user to easily review the most important parts of the API specification. In some embodiments, a confidence score may be associated with the assigned order. In some embodiments, a separate order may not be assigned to the metadata attributes, but instead the score established at block 510 may be used directly to order the metadata attributes when desired.

At block 514, the metamodel generation engine 312 creates structured nodes and links based on dependencies between the metadata attributes. In some embodiments, a structured node may be created for each metadata attribute detected above at block 508, and a link between structured nodes may be created for each dependency between metadata attributes (or metadata attributes that themselves indicate dependencies). The structured nodes and links may be ordered based on the order assigned to the underlying metadata attributes at block 512.

At block 516, the metamodel generation engine 312 stores the validated metadata attributes and dependencies as a metamodel in a metamodel data store 314 of the metamodel management computing system 302. In some embodiments, the metamodel generation engine 312 may also store the API specification along with the metamodel in the metamodel data store 314, or in a specification data store 310 of the metamodel management computing system 302. If stored in the specification data store 310, a link from the metamodel in the metamodel data store 314 to the API specification in the specification data store 310 may be stored along with the metamodel.

The method 500 then proceeds to an end block and terminates.

Creation of Artifacts

Figure 6:
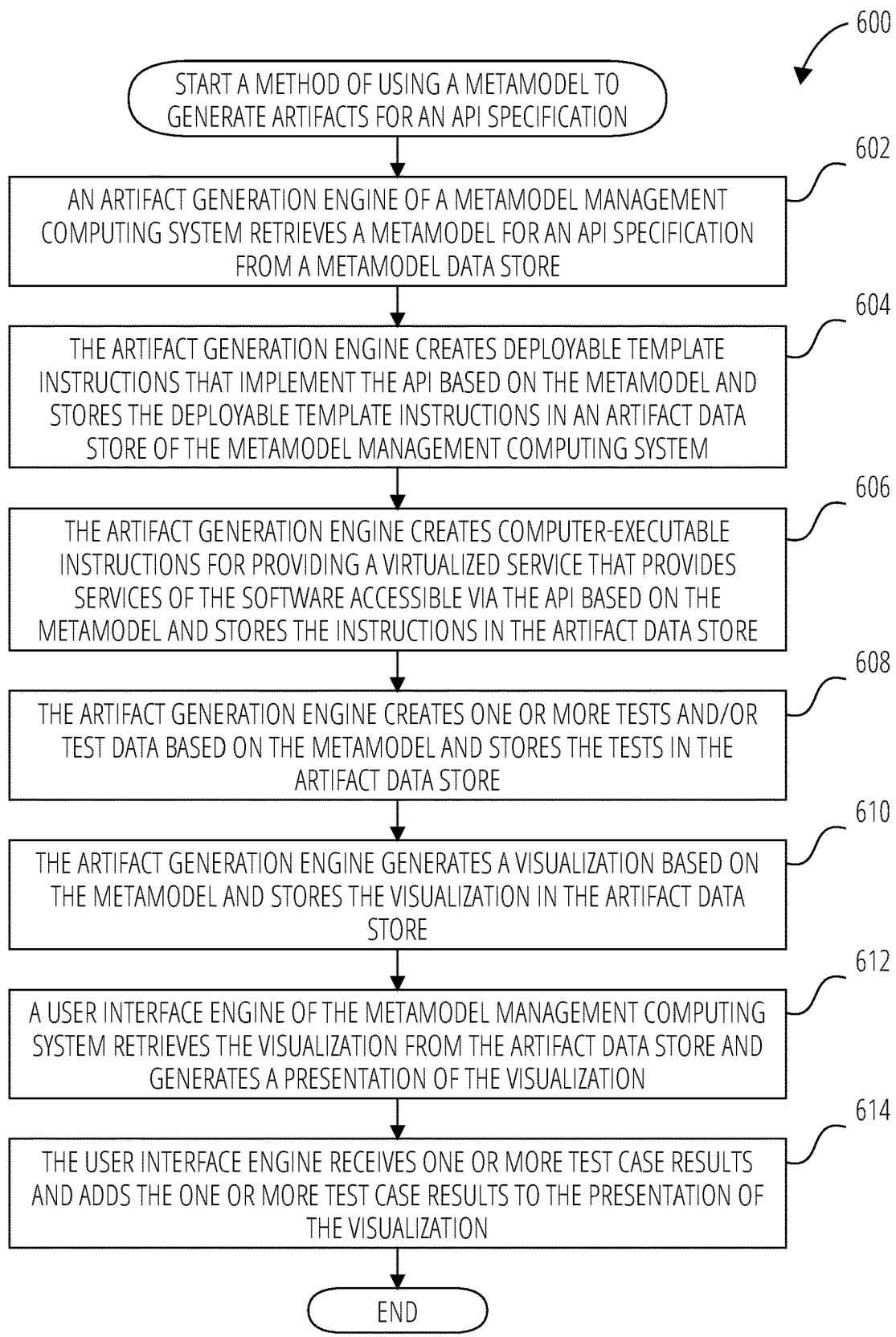
FIG. 6 is a flowchart that illustrates a non-limiting example embodiment of a method of using a metamodel to generate artifacts for an API specification according to various aspects of the present disclosure.

Once a metamodel is created and stored in the metamodel data store 314, the metamodel management computing system 302 is able to use the metamodel to create any of a number of different types of artifacts relevant to the API specification based on the metamodel. FIG. 6 is a flowchart that illustrates a non-limiting example embodiment of a method of using a metamodel to generate artifacts for an API specification according to various aspects of the present disclosure. In the method 600, one or more types of artifacts are generated by the metamodel management computing system 302 based on a metamodel.

One of ordinary skill in the art will recognize that although FIG. 6 illustrates a flow in which various types of artifacts are created for ease of discussion, in some embodiments, fewer than all of the illustrated artifacts may be created, the illustrated artifacts may be created in a different order, and/or a given artifact may be created multiple times. Further, the method 600 describes some artifacts as being created and then stored in an artifact data store 322 of the metamodel management computing system 302. This may be performed in order to be able to provide the stored artifacts in response to future requests. In some embodiments, instead of or in addition to storing the artifacts in the artifact data store 322, the generated artifacts may be used interactively by the metamodel management computing system 302 or by a requesting computing device.

From a start block, the method 600 proceeds to block 602, where an artifact generation engine 318 of a metamodel management computing system 302 retrieves a metamodel for an API specification from a metamodel data store 314. Typically, the metamodel is a metamodel created using a method such as method 500 illustrated and discussed previously.

At block 604, the artifact generation engine 318 creates deployable template instructions (e.g., computer-executable code) that implement the API based on the metamodel and stores the deployable template instructions in an artifact data store 322 of the metamodel management computing system 302. In some embodiments, the artifact generation engine 318 may apply a standard template built for a respective programming language to convert the metamodel to the instructions. The instructions may be human-readable source code that may be interpreted or compiled in order to provide a start for a developer to implement the API. Leveraging metadata attributes created using the text analysis, unique business rules that are not captured in the machine-parseable portions of the API specification may be added to the deployable template instructions.

In some embodiments, the artifact generation engine 318 may package the template code as part of a downloadable API workspace for developers to use. Configurable items may be created as part of the downloadable API workspace for developers to parameterize specific configurations for the API. For example, the downloadable API workspace may include API source code, build environment configuration files, packaging components, Docker components, and/or code for artifacts such as data repositories, security configuration, API service code, and client code. Parameters such as security configurations, desired web URLs to be used, logging settings, datetime and/or localization info, and/or various constants may be provided in one or more editable files that may be changed by the user once the downloadable API workspace is downloaded in order to configure the downloadable API workspace for a specific environment.

At block 606, the artifact generation engine 318 creates computer-executable instructions for providing a virtualized service that provides services of the software accessible via the API based on the metamodel and stores the instructions in the artifact data store 322. The virtualized service may be generated to provide sample results via endpoints of the template instructions generated at block 604, and may use the business functions, status codes, and other metadata attributes of the metamodel to determine the type of data to provide in response to queries.

In some embodiments, the virtualized service may be designed to operate based on a data driven approach. The metamodel may be used to generate test input data and test result data, and this generated test input data and test result data may be stored for consumption by the virtualized service in order to provide expected results when the generated tests are executed. This test input data and test result data may be randomly generated while complying with the restrictions for the data defined in the metamodel. In some embodiments, the generated test input data and test result data may be stored such that it can be reviewed and/or edited by a user before execution. While the virtualized service may not provide actual results available from a full service for implementing the API, automatic creation of the virtualized service may nevertheless be useful for deployment into a development environment to automatically enable integration and other tests. In some embodiments, the virtualized service may be created in multiple programming languages and/or other output formats.

At block 608, the artifact generation engine 318 creates one or more tests and/or test data based on the metamodel and stores the tests in the artifact data store 322. In some embodiments, the artifact generation engine 318 may create tests and/or test data based on parameters, data types, and status codes specified in the metamodel, in order to test that proper status codes are returned for missing required parameters, data type mismatches, and other edge cases.

In some embodiments, the artifact generation engine 318 may use various machine learning techniques to create tests based on the metamodel. For example, template test sets may be created initially as training data for standard specification templates generated on the metamodel, and the template test sets may be stored in the artifact data store 322. Optimal combination tests of the metamodel for the given specification may be generated by a multilayer perceptron. Test sets generated by the multilayer perceptron may be compared against (hidden) template test sets for evaluating noise and confidence levels. The test sets and (optionally) the template tests may be updated based on coupled neural network algorithms to determine a champion vs. a challenger based on efficiency. In some embodiments, the created tests may be executed using a test engine that acts as a delegator between an instance of the API and the generate test sets. The test engine may automatically instrument and record the results of the test cases.

In some embodiments, fabricated test data may be generated using a machine-learning based test data generation engine. The test data generation engine maps relevant data types from the metamodel using a rule-based framework, training data sets and cognitive algorithms to generate new test data. The generated new test data may additionally be compared against new training data sets by mapping one or more databases accessed via the API. An analysis of variance (ANOVA) may be used to find a variance between user-fed training data sets and the existing rule-based framework. Based on the variance percentage and distribution, a confidence level may be derived which is further used to accept least variance data sets to be considered for updating the rule engine.

In some embodiments, fabricated test data may be further based on a deep learning engine that develops context awareness from other API specifications that are publicly available and/or processed by the metamodel management computing system 302. The API specification itself may not necessarily explicitly state business rules that developers should be aware of. Accordingly, the deep learning engine may enrich template information, example data sets, data types, and multiple parameters derived from the attributes for a given API specification. The curated metamodel is compared against the fabricated test data for the given API specification to validate if any additional business rules relevant to a specific industry or domain are missing. If any differences are observed, the fabricated test data generation rule engine is updated. This ensures that generating context aware test data does not require any manual mapping of industry specific or domain specific business rules.

For example, an API specification for a bank account may not specify anywhere that negative values are not allowed for a "balance" element. However, test cases for other API specifications for APIs in the banking sector may indicate that errors are expected if a "balance" element is negative. Accordingly, the fabricated test data for a metamodel representing a new API specification for a banking application may include tests with negative values for a "balance" element since this is seen as an error in APIs within similar businesses.

At block 610, the artifact generation engine 318 generates a visualization based on the metamodel and stores the visualization in the artifact data store 322. At block 612, a user interface engine 320 of the metamodel management computing system 302 retrieves the visualization from the artifact data store 322 and generates a presentation of the visualization. In some embodiments, the visualization may be presented without the intermediate step of storing the visualization in the artifact data store 322. In some embodiments, the visualization may be generated and presented in an interactive manner.

Figure 7:
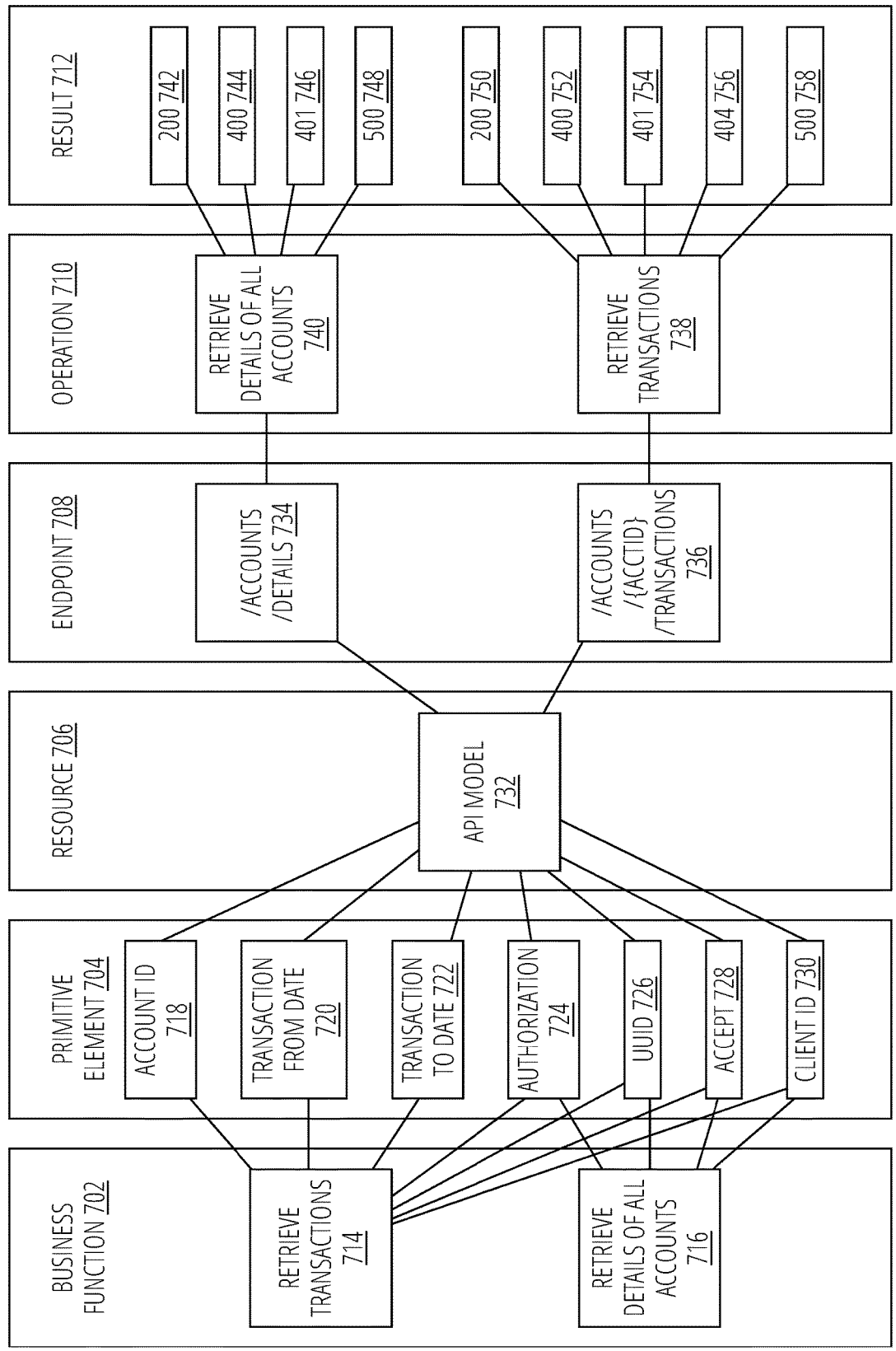
FIG. 7 is a non-limiting example embodiment of a visualization generated based on a metamodel according to various aspects of the present disclosure.

FIG. 7 is a non-limiting example embodiment of a visualization generated based on a metamodel according to various aspects of the present disclosure. Based on the ordered and scored elements of the metamodel, the visualization includes a visual representation of functional and operational flow of the API. Since the visual functional and operational flow is derived based on the ordered and scored elements and resources, this mapping shows the complexity of the API in an easily understandable knowledge representation.

The illustrated embodiment of the visualization includes metadata attributes including business functions 702, primitive elements 704, resources 706, endpoints 708, operations 710, and results 712. The illustrated embodiment also includes links between metadata attributes that indicate which metadata attributes are used or referenced by other metadata attributes. Some of the illustrated aspects, including the results 712 (status codes) and endpoints 708, may be derived directly from the machine-parseable information included in the API specification and added to the metamodel. Other elements, such as the business functions 702, the primitive elements 704, the resources 706, and operations 710, may be derived using the text processing techniques described above.

The API specification used to generate the visualization included two endpoints related to retrieving account information: an account detail endpoint 734 and a transactions endpoint 736. These endpoints may have been derived directly from the machine-parseable information, as may the status codes 742-758 that are associated with the endpoints 734, 736. The text analysis described above may have been used to derive several implied aspects for the metamodel. For example, the text analysis has identified a first operation 740 performed by the account detail endpoint 734 and a second operation 738 performed by the transactions endpoint 736. The text analysis has also determined that the two endpoints 734, 736 are combined into an API model 732 resource.

The primitive elements 704 presented in the visualization may be identified by a combination of machine-parseable information and text analysis. For example, each of the endpoints 708 may provide machine-parseable information identifying the parameters that may be passed to queries using the specific endpoints, and the text analysis may determine that parameters with similar names or described using similar text in comments should be combined in the metamodel and visualized as a single primitive element 704. For instance, both the account detail endpoint 734 and the transactions endpoint 736 use parameters for authorization 724, uuid 726, accept 728, and client id 730. As such, the metamodel and visualization have combined the separate parameters into primitive elements 704. Further, the text analysis has identified business functions 702, including a retrieve transactions 714 business function and a retrieve details of all accounts 716 business function that are related to the primitive elements 704. By visualizing the metamodel in this way, it becomes simple for a developer to see the interactions between aspects of the API specification and how data is used within the API.

Returning to FIG. 6, at block 614, the user interface engine 320 receives one or more test case results and adds the one or more test case results to the presentation of the visualization. As discussed above, a test engine may be provided that instruments and records the results of test cases generated as artifacts. When tests are run with the test engine, the test engine associates the test case with the relevant portions of the metamodel. Accordingly, a user may click on, for example, an endpoint 708 or an operation 710 in order to see summaries or detailed results of test cases that exercise the indicated aspect of the metamodel.

In some embodiments, the visualization may show performance information (e.g., response times, latency, memory usage, etc.), instead of or in addition to test case results. A synthetic monitoring adaptor that obtains performance information and provides it for inclusion in the visualization may be provided. The synthetic monitoring adaptor may be built on top of an API that integrates with monitoring tools including, but not limited to, Splunk, App Dynamic, and/or New Relic. Once configured, real production API monitoring may be visualized by aggregating log data and mapping the log data against the metamodel for inclusion in the visualization.

The method 600 then proceeds to an end block and terminates.

Matching Database Schemas to API Elements to Create New APIs

One aspect of API design is that multiple API specifications are often used to access a common set of databases. While the multiple API specifications can be mined to generate a common metamodel, it is also desirable to represent the databases that are manipulated by the APIs, and to connect the database elements with program elements represented in the metamodel. With this connection, a graphical user interface (GUI) can be generated that allows a developer to visually select program elements from the metamodel and to connect them to desired database entities in order to generate a new API specification.

One problem with existing webservices design environments is that many environments involve a plethora of API specifications interacting with a plethora of databases, and maintaining consistency across the API specifications is difficult (if not impossible). Often, new database entities may be created (or existing database entities may be used inconsistently) due to the unmanageable complexity. By establishing mappings between a metamodel and database entities, the GUI-based API creation described herein can help reduce and eventually eliminate these inconsistencies, and improve the quality of new API specifications while simultaneously reducing the effort needed to create them.

Figure 8:
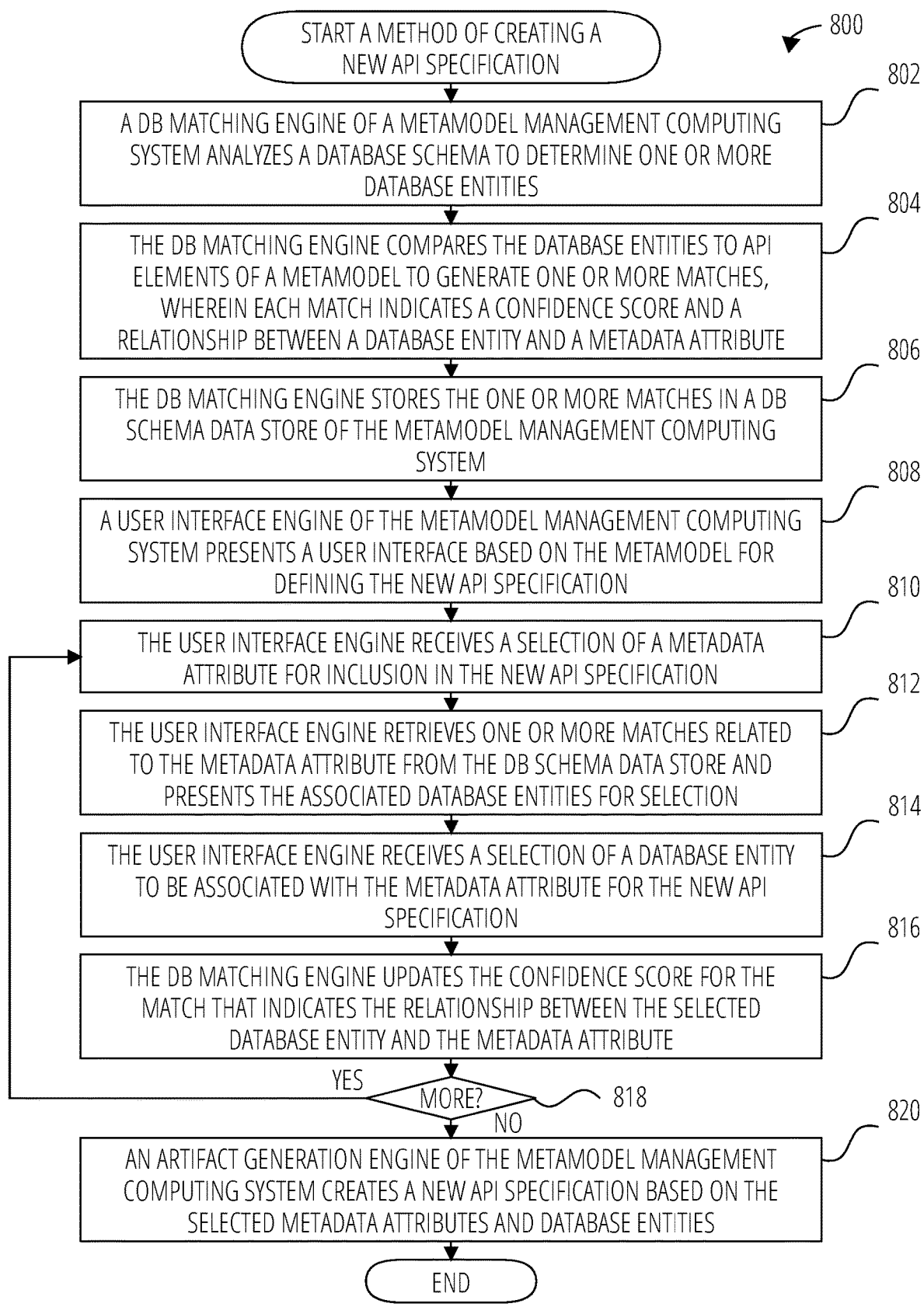
FIG. 8 is a flowchart that illustrates a non-limiting example embodiment of a method creating a new API specification according to various aspects of the present disclosure.

FIG. 8 is a flowchart that illustrates a non-limiting example embodiment of a method creating a new API specification according to various aspects of the present disclosure. The method 800 may be executed by a computing system made up of one or more computing devices, such as the metamodel management computing system 302 illustrated and described above. In some embodiments, the method 800 may generate and use a user interface which is illustrated in FIG. 9A—FIG. 9E, wherein back-end databases are illustrated on the left side of the drawings and the user interface is illustrated on the right side of the drawings. Descriptions of FIG. 9A—FIG. 9E are included within the discussion of the method 800.

From a start block, the method 800 proceeds to block 802, where DB matching engine 324 of a metamodel management computing system 302 analyzes a database schema to determine one or more database entities. Database entities are logical objects stored in a database that is organized according to the database schema. Each database entity may be associated with a name of the database entity and a data type of information stored by the database entity. In some embodiments, a column of a table may represent a database entity. In some embodiments, database entities may be logically grouped into database entity groups. Each database entity group may be associated with a name of the database entity group and one or more database entities included therein. In some embodiments, a table of the database may represent a database entity group, and the columns of the table may represent the database entities within the database entity group.

At block 804, the DB matching engine 324 compares the database entities to API elements of a metamodel to generate one or more matches, wherein each match indicates a confidence score and a relationship between a database entity and a metadata attribute, and at block 806 the DB matching engine 324 stores the one or more matches in a DB schema data store 316 of the metamodel management computing system 302. As discussed above, the metamodel includes one or more metadata attributes that identify one or more program elements accessible via one or more existing APIs. Each match indicates a confidence score and a relationship between a database entity and a metadata attribute.

The DB matching engine 324 may use any suitable technique to compare the database entities to the metamodel. In some embodiments, the metadata attributes in the metamodel may be organized into one or more metamodel schemas (e.g., the business functions 702 and/or operations 710 illustrated in FIG. 7). The DB matching engine 324 may compare a metamodel schema to a database entity group, and determine a match with a high or low confidence based on a comparison of a name of the metamodel schema to a name of the database entity group, a comparison of a number of metadata attributes in the metamodel schema (e.g., a number of primitive elements 704 accessed by a business function 702) to a number of database entities in the database entity group, a comparison of names of the metadata attributes in the metamodel schema to names of the database entities in the database entity group, a comparison of data types stored in or accessed by the metadata attributes in the metamodel schema to data types stored in the database entities in the database entity group, or any other suitable comparison.

In addition to comparing the metamodel schemas and database entity groups to determine match confidences for these matches, the DB matching engine 324 may also (or instead) compare individual metadata attributes to individual database entities using similar techniques to determine confidence scores for matches between individual metadata attributes (e.g., a primitive element 704) and database entities (e.g., a column in a table). In some embodiments, a single metamodel schema may match to a single database entity group. In some embodiments, multiple metamodel schemas may match to a single database entity group. Likewise, in some embodiments, a single metamodel schema may match to multiple database entity groups.

Any suitable technique may be used to compare names of metamodel schemas or metadata attributes to names of database entity groups or database entities. In some embodiments, various natural language processing techniques may be used for these comparisons. For example, in some embodiments, a natural language processing technique may be used to determine a meaning of each name, and then comparing the meanings (e.g., a name of "expiry date" would be determined to be highly similar to a name of "expiration date"). As another example, synsets may be used to indicate semantically equivalent terms. The synsets may include terms for particular subject areas, including but not limited to common business jargon terms (e.g., claimant: insured, role:relationship, disbursement:payment, pre-authorization:prior authorization, member:patient, conversions:sales, footfall:visits, etc.).

In some embodiments, one or more comparison heuristics may be used for the name comparison, including but not limited to comparing one or more starting characters of each name. In some embodiments, names may be broken into sub-names (e.g., breaking on whitespace, breaking on non-letter characters, etc.), and the sub-names may be compared against each other. For example, F_NAME and FIRST NAME would be broken into "F"/"NAME" and "FIRST"/"NAME", respectively, and the "NAME" sub-names would have a complete match between the two. In some embodiments, an edit distance, cosine similarity, or other metric that quantifies a difference between the names may be used for the comparison.

In some embodiments, multiple different comparisons may be performed. The percentage match for each comparison may be summed, and then normalized to a value between 0 and 1 to finally determine the confidence score for each match. Matches below a minimum confidence score threshold may be discarded, such that matches are not created between database entities and metadata attributes that are highly unlikely to be related.

At block 808, a user interface engine 320 of the metamodel management computing system 302 presents a user interface based on the metamodel for defining the new API specification. In some embodiments, the user interface may include an interface element associated with each metadata attribute in the metamodel. In some embodiments, a size of each interface element may be based on a criticality of the associated metadata attribute in the metamodel (e.g., how many times the metadata attribute is referenced within API specifications, how many different metadata attributes are related to the metadata attribute, etc.). In some embodiments, the interface elements may be organized according to metamodel schemas.

Figure 9A:
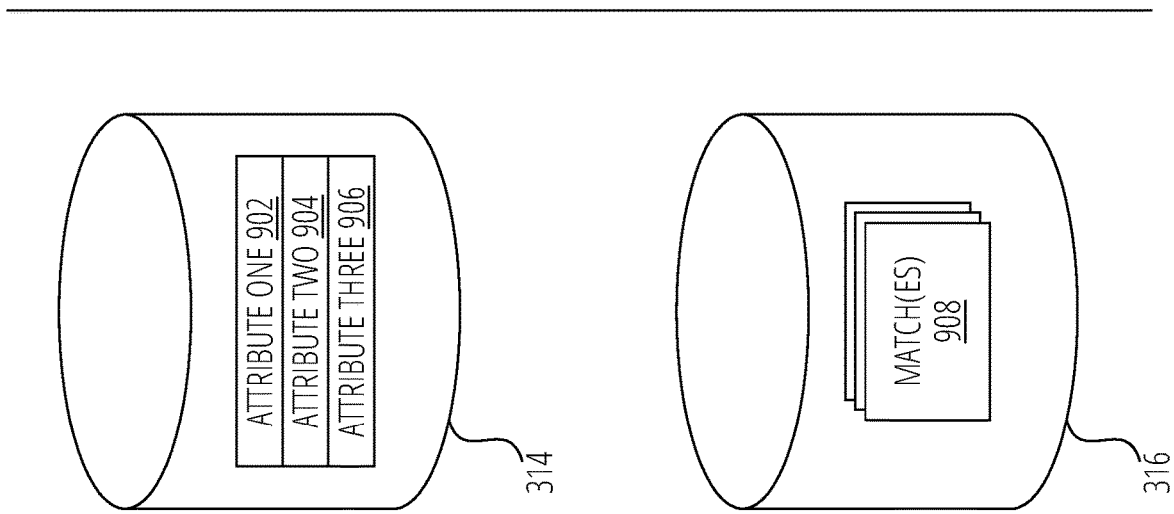
FIG. 9A—FIG. 9E are schematic illustrations of a non-limiting example embodiment of a user interface generated during the method illustrated in FIG. 8 according to various aspects of the present disclosure.

In FIG. 9A, the left side of the drawing illustrates the metamodel data store 314 and the DB schema data store 316. In the metamodel data store 314, a metamodel having three metadata attributes—attribute one 902, attribute two 904, and attribute three 906—is illustrated. The DB schema data store 316 stores a plurality of matches 908 between database entities in one or more databases and the metadata attributes of the metamodel.

Figure 9B:
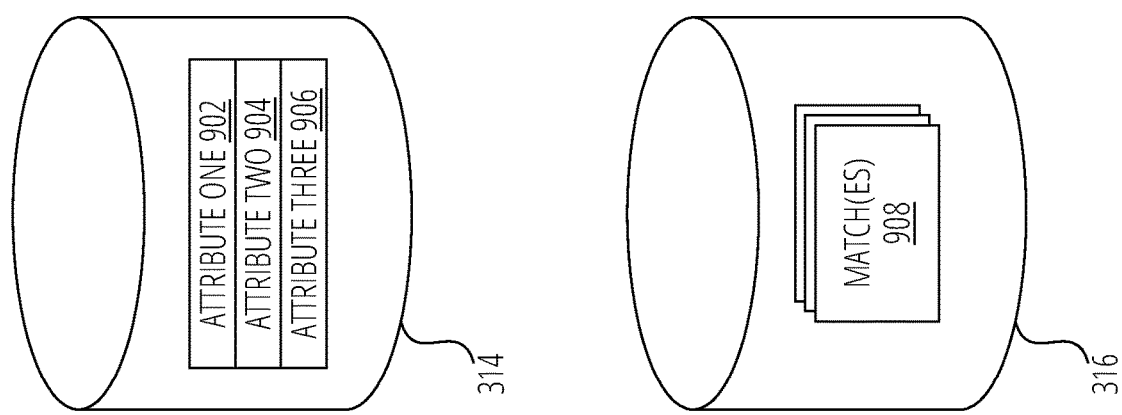

In FIG. 9B (and continuing through FIG. 9C—FIG. 9E), the right side of the drawing illustrates a non-limiting example embodiment of a user interface created by the user interface engine 320. As shown in FIG. 9B, the three metadata attributes from the metamodel stored in the metamodel data store 314 are displayed for selection at the top of the interface. In some embodiments, the metadata attributes may be presented in different sizes or colors according to a criticality of each metadata attribute indicated by the metamodel.

Figure 9C:
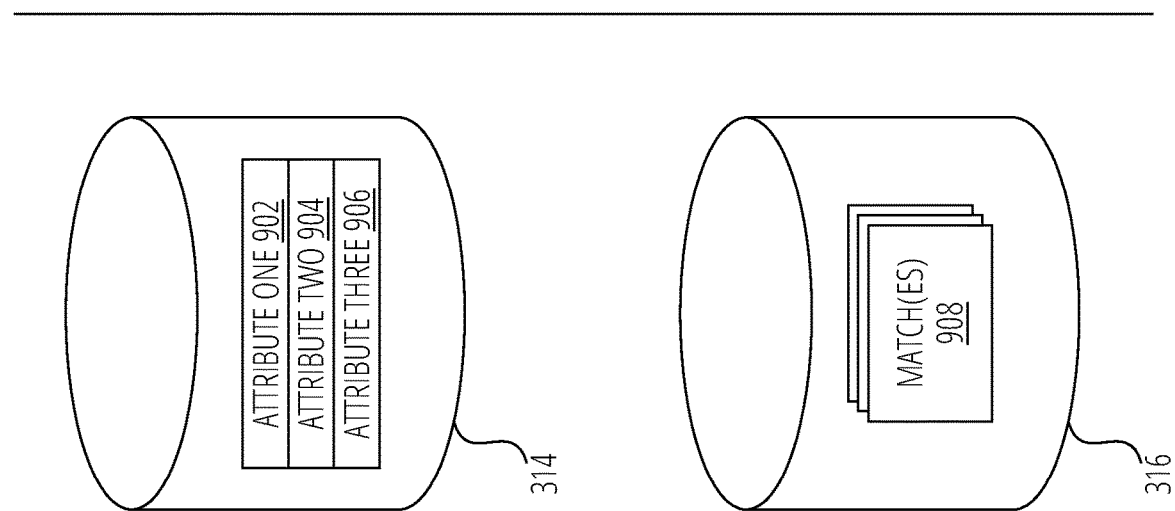

Returning to FIG. 8, at block 810, the user interface engine 320 receives a selection of a metadata attribute for inclusion in the new API specification. The selection may be made by any suitable technique, including but not limited to clicking or tapping on an interface element associated with the metadata attribute, dragging-and-dropping the interface element associated with the metadata attribute to an "add element" area of the user interface, or any other suitable technique. FIG. 9C illustrates that attribute one 902 was selected by the user at block 810.

At block 812, the user interface engine 320 retrieves one or more matches related to the metadata attribute from the DB schema data store 316 and presents the associated database entities for selection. The user interface engine 320 may determine a highest confidence match associated with the metadata attribute. That is, the user interface engine 320 will review the matches that reference the metadata attribute, and will determine the match that is associated with the highest confidence score. This match indicates the database entity the system believes is most likely that the user wants the metadata attribute to manipulate. The user interface engine 320 may then present the determined database entity (along with, optionally, the confidence score) for the user to confirm that the determined database entity should be used. The user may confirm that the determined database entity should be used, or may specify a selection of a different database entity to be used instead of the determined database entity.

In some embodiments, the user interface engine 320 may present the database entity for the highest confidence match, along with other database entities of lower-confidence matches. In such embodiments, the user interface engine 320 may present the database entity associated with the highest confidence match in a first color, and may present other database entities in one or more other colors; may present the database entities in different sizes according to the confidence scores, and/or may represent the database entities according to confidence score in any other suitable format.

In some embodiments, the user interface engine 320 may present the database entity for the highest confidence match as a recommended database entity if the confidence score for the highest confidence match is greater than a predetermined threshold. If the confidence score for the highest confidence match fails to meet the predetermined threshold, then the user interface engine 320 may provide a set of database entities that are potentially desirable for selection by the user.

Figure 9D:
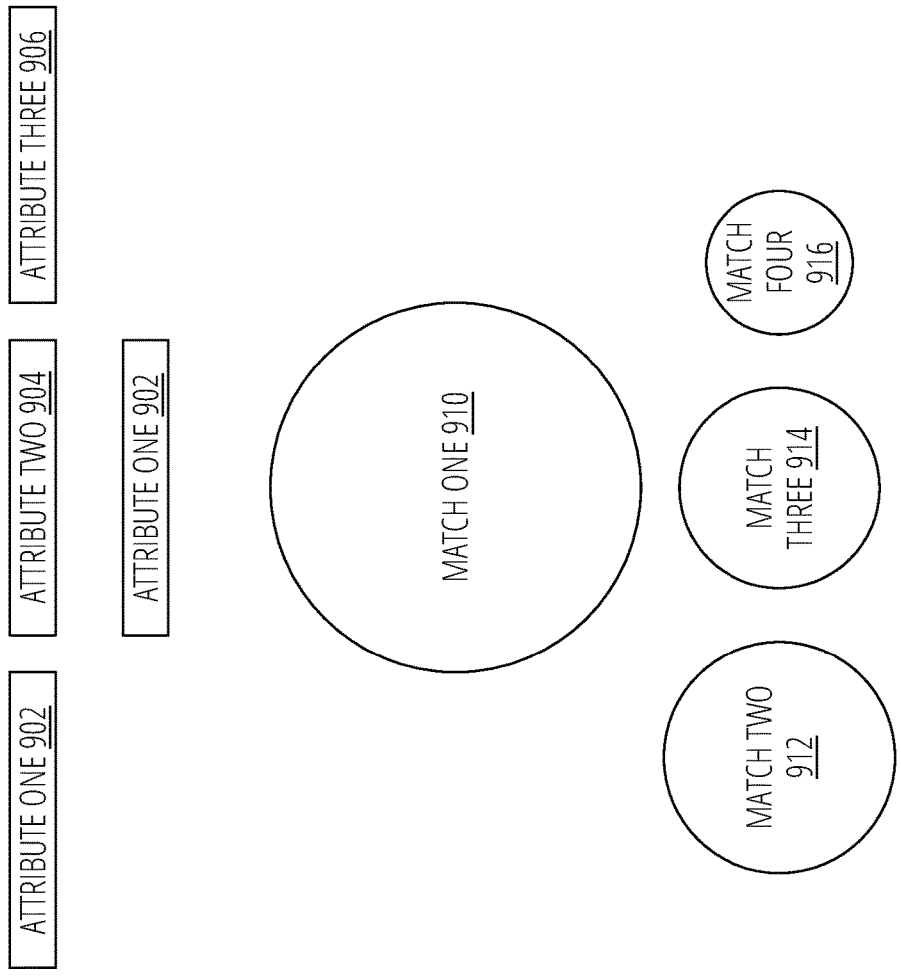
Figure 9D:
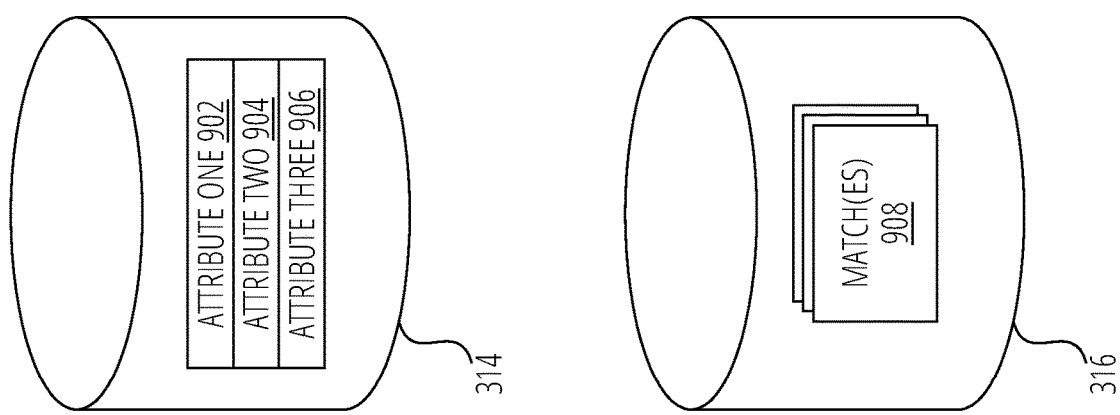

In FIG. 9D, a non-limiting example embodiment of the user interface with matches for the selected attribute one 902 is illustrated. As shown, the user interface engine 320 determined that four matches—match one 910, match two 912, match three 914, and match four 916—were associated with the selected attribute one 902. Each illustrated match specifies a database entity the system believes is likely the developer would want to associate with attribute one 902 of the metamodel for the new API specification. The matches are illustrated in different sizes according to the confidence score of each match. Accordingly, since match one 910 has the highest confidence score, it is the largest illustrated match, with match two 912, match three 914, and match four 916 of decreasing sizes according to their decreasing confidence scores. Further, since the confidence score of match one 910 is higher than a predetermined threshold, match one 910 is placed at the top of the other matches as a determined recommended database entity.

Though a static interface is illustrated, one will recognize that other interactive features may be present. For example, interacting with any of the matches may present additional information about the match, including but not limited to one or more of an identification of an associated database entity and a quantification of the confidence score. Also, though the illustrations show the matches being presented, one will recognize that in some embodiments, the presentation may be centered around/may illustrate the database entity associated with the match instead of the match itself.

Returning to FIG. 8, at block 814, the user interface engine 320 receives a selection of a database entity to be associated with the metadata attribute for the new API specification. The selection may be made by any suitable technique, including but not limited to clicking on the selected match for the database entity.

At block 816, the DB matching engine 324 updates the confidence score for the match that indicates the relationship between the selected database entity and the metadata attribute. In some embodiments, if the determined database entity was confirmed, the confidence score for the highest confidence match may be raised, and confidence scores for matches that reference the metadata attribute and other database entities may be lowered. In some embodiments, if the determined database entity was not confirmed, the confidence score for the highest confidence match may be lowered and the confidence score for the match associated with the metadata attribute and the selected database entity may be increased.

Figure 9E:
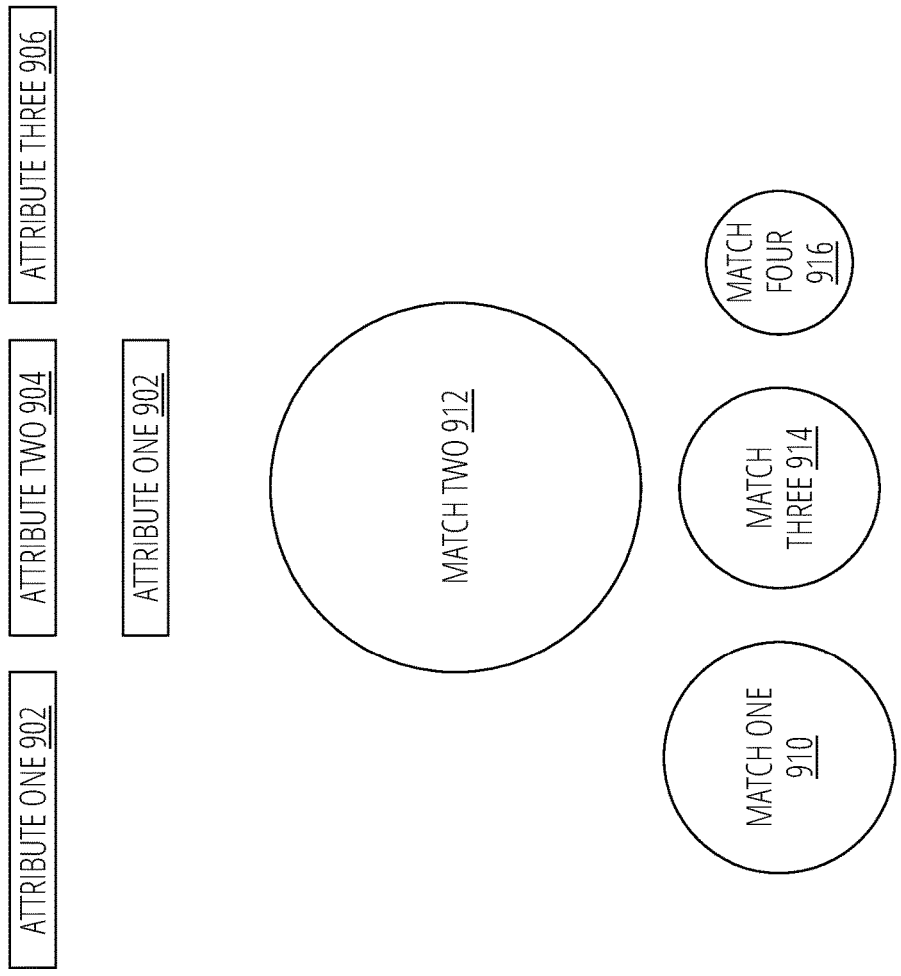
Figure 9E:
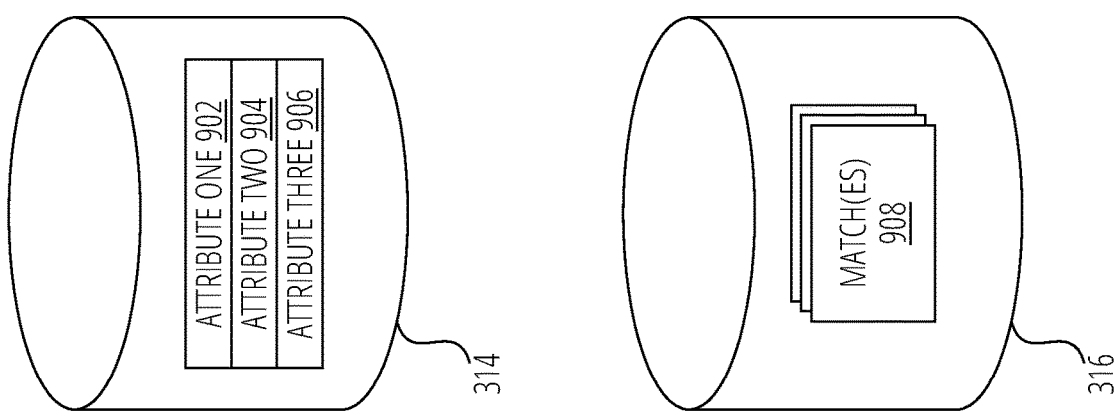

FIG. 9E illustrates a non-limiting example embodiment of the user interface that assumes the user chose match two 912 and the DB matching engine 324 has updated the confidence scores for the matches. As shown, match two 912 is now larger because its confidence score has increased, and match one 910 is now smaller because its confidence score has decreased. In some embodiments, the user interface may be updated in this way after the selection has been made. In some embodiments, the confidence scores may be updated within the DB schema data store 316 without updating the user interface, but the user interface is illustrated in this way in FIG. 9E for purposes of explanation.

One will note that, by updating the sizes of the matches, more frequently used matches will continue to grow in relative size, and less frequently used matches will continue to shrink in relative size. This will increasingly emphasize the frequent matches and increasingly de-emphasize the infrequent matches, and will help future API specifications created with the user interface to converge on using standard database entities instead of spreading amongst infrequently used database entities.

Returning to FIG. 8, the method 800 then proceeds to a decision block 818, where a determination is made regarding whether more metadata attributes are to be added to the new API specification. If so, then the result of the determination at decision block 818 is YES, and the method 800 returns to block 810 to process the next selection of a metadata attribute. Otherwise, if no further metadata attributes are to be added to the new API specification, then the result of the determination at decision block 818 is NO, and the method 800 proceeds to block 820.

At block 820, an artifact generation engine 318 of the metamodel management computing system 302 generates a new API specification based on the selected metadata attributes and database entities. The new API specification may then be used to automatically generate a metamodel and stub code, test cases, and/or other artifacts associated with the API specification as described above.

The method 800 then proceeds to an end block and terminates.

While illustrative embodiments have been illustrated and described, it will be appreciated that various changes can be made therein without departing from the spirit and scope of the invention.

The invention claimed is:

1. A computer-implemented method of automatically generating support infrastructure artifacts for software accessible via an application programming interface (API), the method comprising:
   processing, by a computing system, an API specification document to extract metadata representing API elements;
   scoring, by the computing system, the metadata to determine order and rank of the API elements;
   mapping, by the computing system, dependencies between the API elements using the orders and the ranks to create a metamodel, wherein the metamodel includes a map of metadata attributes and links that represent functional and operational aspects of program elements accessible via the API; and
   storing the metamodel for use in generating support infrastructure artifacts;
   wherein processing the API specification document to extract metadata representing API elements includes:
      annotating elements within the API specification document;
      analyzing text of the annotated elements; and
      identifying key elements based on the textual analysis as the metadata.

2. The computer-implemented method of claim 1, wherein analyzing text of the annotated elements includes at least one of:
   processing the text of the annotated elements using natural language processing techniques; and
   processing the text of the annotated elements using rule-based techniques.

3. The computer-implemented method of claim 1, wherein scoring the metadata to determine order and rank of the API elements is based on at least one of frequency of usage of the element, whether the element is optional or mandatory, data type characteristics of the element, and entity and relationships within and between resources associated with the element.

4. The computer-implemented method of claim 1, wherein determining order and rank of the API elements includes determining whether each element is a business function, a primitive element to be operated on by other entities, a resource, an operation, or a result.

5. The computer-implemented method of claim 1, further comprising:
   validating the map of metadata attributes and links against a statistical confidence interval.

6. The computer-implemented method of claim 1, further comprising:
   automatically generating computer-executable instructions based on the metamodel.

7. The computer-implemented method of claim 6, wherein the automatically generated computer-executable instructions include deployable template code that implements the API.

8. The computer-implemented method of claim 6, wherein the automatically generated computer-executable instructions, in response to execution by one or more processors of a computing device, cause the computing device to provide a virtualized service that provides services of software accessible via the API.

9. The computer-implemented method of claim 1, further comprising:
   generating one or more tests based on the metamodel.

10. The computer-implemented method of claim 1, further comprising generating test data using machine learning and the metamodel, and wherein generating test data using machine learning and the metamodel includes:
    generating at least one of tests and test data based on comparing the metamodel to metamodels of other similar API specifications to determine tests for undetected business rules.

11. The computer-implemented method of claim 1, wherein processing the API specification document to extract metadata representing API elements includes consideration of other similar APIs to determine as-yet undetected business rules.

12. A computer-implemented method of automatically generating support infrastructure artifacts for software accessible via an application programming interface (API), the method comprising:
    processing, by a computing system, an API specification document to extract metadata representing API elements;
    scoring, by the computing system, the metadata to determine order and rank of the API elements;
    mapping, by the computing system, dependencies between the API elements using the orders and the ranks to create a metamodel, wherein the metamodel includes a map of metadata attributes and links that represent functional and operational aspects of program elements accessible via the API;
    storing the metamodel for use in generating support infrastructure artifacts; and
    generating a visualization of the metamodel;
    wherein generating the visualization includes generating a presentation of at least one metadata attribute in a user interface on a display device; and
    wherein the at least one metadata attribute is a business function, a functional element, a resource, an endpoint, an operation, and a status code.

13. The computer-implemented method of claim 12, wherein the presentation of at least one metadata attribute includes at least one metadata attribute of a first type and at least one metadata attribute of a second type, and wherein generating the visualization further includes:
    generating a presentation of a link that indicates that the at least one metadata attribute of the first type is used by the at least one metadata attribute of the second type.

14. The computer-implemented method of claim 12, wherein generating the visualization includes:
    generating a presentation of at least one test result associated with at least one metadata attribute associated with the test result.

15. The computer-implemented method of claim 12, wherein generating the visualization includes:
    generating a presentation of at least one performance metric associated with at least one metadata attribute.

16. A non-transitory computer-readable medium having computer-executable instructions stored thereon that, in response to execution by one or more processors of a computing system, cause the computing system to perform actions for automatically generating support infrastructure artifacts for software accessible via an application programming interface (API), the actions comprising:
- processing, by the computing system, an API specification document to extract metadata representing API elements;
- scoring, by the computing system, the metadata to determine order and rank of the API elements;
- mapping, by the computing system, dependencies between the API elements using the orders and the ranks to create a metamodel, wherein the metamodel includes a map of metadata attributes and links that represent functional and operational aspects of program elements accessible via the API; and
- storing the metamodel for use in generating support infrastructure artifacts;
- wherein processing the API specification document to extract metadata representing API elements includes:
  - annotating elements within the API specification document;
  - analyzing text of the annotated elements; and
  - identifying key elements based on the textual analysis as the metadata.

17. The non-transitory computer-readable medium of claim 16, wherein the actions further comprise:
- generating a visualization of the metamodel, wherein generating the visualization includes generating a presentation of at least one metadata attribute in a user interface on a display device.

18. The non-transitory computer-readable medium of claim 16, wherein the actions further comprise:
- automatically generating computer-executable instructions based on the metamodel.

19. The non-transitory computer-readable medium of claim 18, wherein the automatically generated computer-executable instructions include at least one of:
- deployable template code that implements the API; or
- computer-executable instructions that, in response to execution by one or more processors of a computing device, cause the computing device to provide a virtualized service that provides services of software accessible via the API.

20. The non-transitory computer-readable medium of claim 16, wherein processing the API specification document to extract metadata representing API elements includes consideration of other similar APIs to determine as-yet undetected business rules.

* * * * *